E. J. GOULD.
OSCILLATING WHEEL AND DRIVING MECHANISM.
APPLICATION FILED JUNE 18, 1921.
1,426,860.
Patented Aug. 22, 1922.
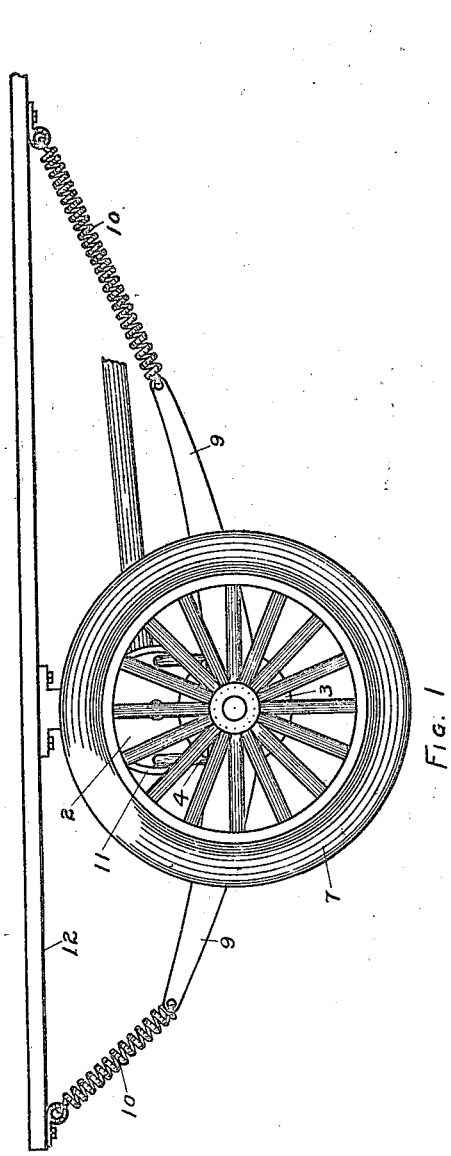
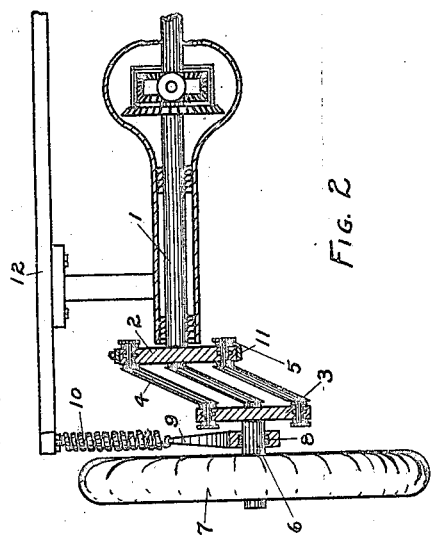
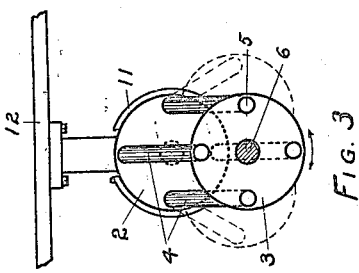
INVENTOR
BY Edward J. Gould
ATTORNEY

UNITED STATES PATENT OFFICE.

EDWIN J. GOULD, OF OAKLAND, CALIFORNIA.

OSCILLATING WHEEL AND DRIVING MECHANISM.

1,426,860.

Specification of Letters Patent. Patented Aug. 22, 1922.

Application filed June 18, 1921. Serial No. 478,723.

*To all whom it may concern:*

Be it known that I, EDWIN J. GOULD, a citizen of the United States, residing at Oakland, county of Alameda, State of California, have invented certain new and useful Improvements in Oscillating Wheels and Driving Mechanism, whereof the following is a specification.

My invention relates to improvements in motor vehicle wheels and consists of a combined oscillating wheel and driving mechanism, and the object of my improvements are, to provide a vehicle wheel that will oscillate upon striking an obstruction, combined with a driving mechanism, that will freely allow such oscillation and will at the same time exert the full driving power on the wheel in any position the wheel may assume in oscillating, or even allow the wheel and stub axle to which it is attached, to make a complete circuit around the driving axle. Further objects and advantages of the invention will be brought out in the specifications and the novelty of construction will be particularly pointed out in the claims.

I attain these objects by the mechanism illustrated in the accompanying drawings in which—Fig. 1 is a view in elevation of the device with vehicle wheel attached; Fig. 2 is a view in elevation at right angles to Fig. 1 showing the drive disks and collar in section; Fig. 3 is a view of the driving mechanism the dotted lines showing different positions assumed in oscillating.

Similar numerals refer to similar parts throughout the several views. 1 is drive axle of motor vehicles shown encased in housing and connected to differential; 2 is drive disk keyed to the drive axle; 3 is a similar drive disk keyed to a stub axle; 4 are the pitmen, in this construction four are used connecting disk 2 with disk 3; 5 indicates one of the studs revolubly connecting the ends of the pitmen to the disks 2 and 3; 6 is a stub axle to which disk 3 is keyed, and to which the vehicle wheel 7 is also solidly attached; 8 is a collar in which stub axle 6 revolves; 9—9 are arms extending from and forming part of collar 8; 10—10 are springs one end of each spring being attached to one of the arms 9 and the other end of each spring being attached to the frame of the vehicle; 11 is a band brake surrounding the disk 2 and adapted to bring friction to bear on the rim of said disk in the usual manner when acting as a brake to the vehicle.

In operation when power is applied to the drive axle 1, drive disk 2 being keyed to the drive axle rotates, and through the pitmen 4 connecting it with disk 3 rotates disk 3. Disk 3 being keyed to the stub axle 6, and the vehicle wheel 7 being solidly attached to the opposite end of the stub axle 6 is therefore rotated at the same speed and in the same direction as the drive axle 2. The collar 8 (in which the stub axle 6 revolves) is attached by the coil springs 10—10 to the frame of the vehicle, and when the springs are at the proper tension they hold the stub axle in the position beneath the driving axle as shown in Fig. 2. When the vehicle wheel strikes an obstruction either when the vehicle is running forward or backward the wheel oscillates and rises over the obstruction without raising the body of the vehicle, and also entirely doing away with any lateral shock. One great advantage of this construction is, that the driving mechanism itself acts as a perfect crank holding the vehicle wheel in position, the pitmen, preferably four (4) in number, bracing the wheel against side sway and holding the wheel in alignment when the weight of the vehicle is thrown mostly on the wheels on one side, at the same time the pitmen act as a perfect gearless drive transferring power to the wheels with the minimum of loss and also allows the vehicle wheel and stub axle to which the wheel is solidly attached to make a complete circuit around the drive axle when the wheel goes over an obstruction, adding greatly to the efficiency and capacity in eliminating all shock and jar from the vehicle. This construction is easily adapted to the combination with a band brake, without any material change in the construction of the brake.

I reserve the right to make any modifications in construction that may properly come within the protection prayed.

Having thus described my invention what I claim is,

1. The combination in an oscillating wheel and driving mechanism, of a disk and pitman drive, a means for rotating one disk of said drive, a stub axle attached to the other disk of said drive, a wheel attached to said stub axle, a collar in which said stub axle revolves, and springs attaching said collar to the vehicle frame in such manner as to hold said stub axle beneath the driving axle and at the same time allow said stub axle and attached wheel to oscillate, backward and upward whenever said wheel encounters an obstacle.

2. The combination in an oscillating wheel and driving mechanism of a disk and pitman drive, a stub axle attached to one disk of said drive, a wheel attached to said stub axle, a collar in which said stub axle revolves, springs attached to said collar in such manner as to allow said stub axle to oscillate and a band brake fitted to one disk of said drive substantially as set forth.

3. The combination in an oscillating wheel and driving mechanism of a disk and pitman drive, a driving axle for rotating one disk of said drive, a stub axle solidly attached to the other disk of said drive, a wheel solidly attached to said stub axle, a collar surrounding said stub axle, springs connecting said collar to a vehicle frame in such manner as to hold said stub axle lower than the driving axle and at the same time allow said stub axle and wheel to make a complete circuit around said driving axle whenever the wheel meets enough resistance to stretch the springs sufficiently.

4. The combination in an oscillating wheel and driving mechanism, of a disk and pitman drive, a band brake fitting one disk of said drive, means for rotating said disk to which said brake is fitted, pitman connecting said first named disk to a second disk, a stub axle attached to said second disk, a wheel attached to said stub axle, a collar fitting around said stub axle and springs attached to said collar and attached to the vehicle in such manner as to allow the wheel to oscillate or make a complete circuit around the first named disk while being driven.

In testimony that I claim the foregoing, I have hereunto set my hand in the presence of two witnesses, this 8th day of April, 1921.

EDWIN J. GOULD.

Witnesses:
EDMUND BOW,
G. H. NOBLE.